Feb. 7, 1961  R. GERLIPP  2,970,492
FRICTION DRIVE TRANSMISSION
Filed May 11, 1959

INVENTOR.
ROBERT GERLIPP
BY
ATTORNEY

United States Patent Office 2,970,492
Patented Feb. 7, 1961

2,970,492

FRICTION DRIVE TRANSMISSION

Robert Gerlipp, Ridgewood, N.Y., assignor to Haft & Sons, Inc., Brooklyn, N.Y., a corporation of New York Filed May 11, 1959, Ser. No. 812,332

2 Claims. (Cl. 74—209)

This invention relates to electric motors and more particularly to a friction drive transmission of simple, inexpensive construction and characterized by substantial freedom from vibration and noise.

One of the objects of the invention is to provide a friction drive transmission wherein the driving and driven shafts are connected through a frictional arrangement which is so constructed that the amount of friction is maintained substantially constant.

Another object of the invention is to provide a friction drive transmission comprising a driving shaft, a driven shaft, a friction wheel in contact with and actuated by said driving shaft, a rotatable shaft on which said friction wheel is fixedly secured and gearing connecting said friction wheel shaft with said driven shaft for turning the last-named shaft.

A still further object of the invention is to provide a friction drive transmission of the character described wherein the frame in which the transmission components are mounted is constructed in two parts pivotally connected to one another together with a longitudinally expansible and contractable helical spring or like element having its ends secured to said frame on opposite sides of the pivot point thereof for the purpose of maintaining the friction between the driving shaft and the friction wheel at a substantially constant value.

Other and further objects and advantages will be understood or appreciated by those skilled in this art or will be apparent or pointed out hereinafter.

In the accompanying drawing in which a preferred embodiment of the new friction drive transmission is illustrated:

Figure 1:
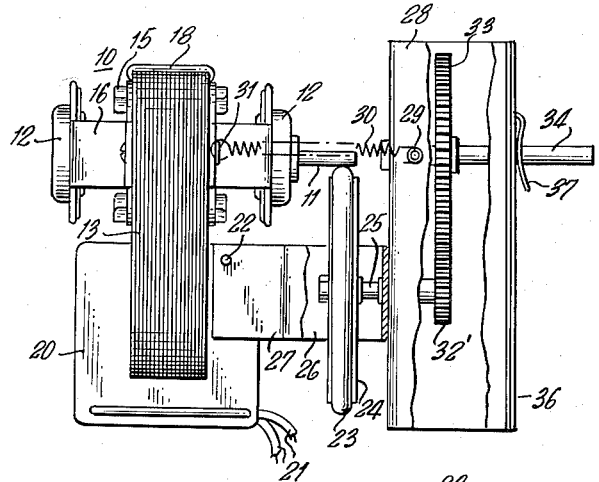
Fig. 1 is a side elevational view partly broken away and in section to show underlying construction of the friction drive motor constituting the present invention.
Figure 2:
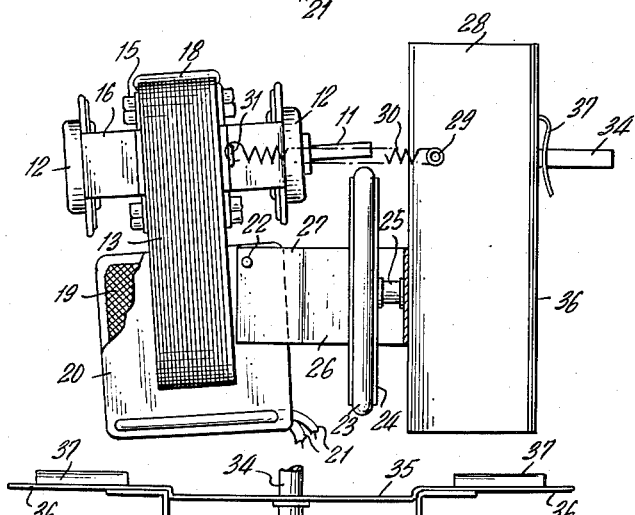
Fig. 2 is a view generally similar to Fig. 1, but showing the frame in pivoted condition as compared with Fig. 1, which shows the frame in normal operating condition.
Figure 3:
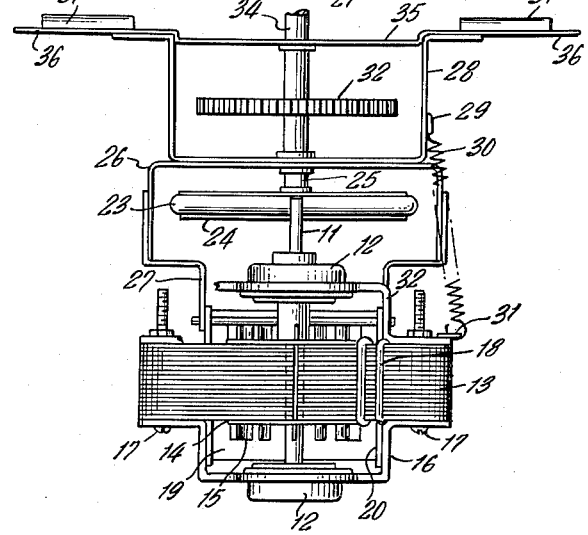
Fig. 3 is a top plan view of the new motor.

Referring to the drawing in detail, the numeral 10 designates a standard or known electric motor having a driving shaft 11 mounted in suitable bearings 12 and passing through a stator 13, which acts in known electrical manner and within which is disposed the rotor 14 having struck-up plates or cooling fins 15 and which rotor is suitably mounted on and rotatable with driving shaft 11. Bearings 12 are mounted In U-shaped brackets or yokes 16 secured by screws or other fastening instrumentalities 17 to the stator 13. The stator is made up of a number of parallel plates which are suitably held together as a unit by the binders 18 which are partially or wholly countersunk in transverse grooves extending across the top of the assembled plates forming the stator. Below the stator are the windings 19 disposed between end plates 20 and from which windings lead wires 21 extend to a suitable plug (not shown) for insertion into the usual electrical outlet. The end plates 20 also serve as a frame element and are provided with apertures through which extends the pintle or hinge pin 22. It will be noted that driving shaft 11, which is rotated when the motor is plugged in to a source of electricity, extends only a relatively short distance from its bearings and that it terminates above and normally in contact with the nylon or rubber ring 23 set into the annular groove of friction wheel 24, which is mounted on a shaft 25 within and protected by quadrangular plate frame 26 which may be fabricated from a plurality of appropriately configured steel plates secured in overlapping condition, as shown in Fig. 3, but which may be made unitarily, if desired, or preferred.

Frame 26 terminates at its motor side in a pair of spaced parallel flanges 27 having apertures registering with the apertures in end plates 20 and through all of which the pintle or hinge pin 22 extends, thereby forming a pivot or fulcrum as will be hereinafter more fully described. The opposite side of the frame 26 is suitably secured in any desired manner in abutting relationship to the frame element 28, of general box shape, and on one side thereof there is provided a member 29 which serves as an anchor for one end of helical spring 30, the other end of which is suitably anchored to a plate or lug 31 on the end of the U-shaped bearing supporting plate 32 secured to stator 13 by means of the fastening instrumentality 17 already referred to.

It will be observed also that the helical spring 30 or other longitudinally contractable and expandable element is disposed at a level substantially the same as that of the driving shaft 11 and is above the pintle or hinge pin 22. The shaft 25 on which the friction wheel 24 is mounted terminates within frame element 28 and is provided at its terminus with a pinion gear 32', this pinion gear meshing with gear 33 mounted on the driven shaft 34, which last-named shaft is rotatably mounted in frame element 28 and its back plate 35. Frame element 28 may be provided with laterally extending flanges 36 having struckup therefrom or otherwise provided thereon the supporting hooks or hangers 37 by means of which the transmission may be suitably mounted or arranged in relationship to its environment and depending on the particular use which is to be made of the transmission.

It will be appreciated from the foregoing that when the motor is connected to a suitable source of electric current driving shaft 11 rotates and since it is in contact with the ring 23 of friction wheel 24 rotation of said wheel and of its shaft 25 is thereby effected and, in turn, through gearing 32', 33 rotates driven shaft 34 which is connected to any object, device or element which has to be actuated by said motor and which may, for example, be what is known as a point of purchase display such as a window or counter display or for any other purpose for which a friction drive transmission construction will be understood. Due to the pivotal frame construction above described, it will be appreciated that there is a yieldability and resiliency in the unit as a whole to meet various operating conditions encountered during use and especially where the nature of the display or other actuated device might tend to throw the drive shaft slightly out of alignment or in some cases such is intentional so as to "break" the drive in order to provide intermittent or timed actuation of the display or other device. The described arrangement has the further advantage that starting torque does not jam or stall the motor.

Major advantages of the new construction, however, are simplicity of construction, low cost and quiet operation substantially or entirely free from vibration and noise. Another major feature and advantage of the invention resides in the pivotal frame arrangement and the contractable and expansible members such as the helical spring 30, which tends to maintain the frictional contact between the driving shaft 11 and the nylon or rubber ring 23 at a constant value and to prevent undue or unintended slippage.

The foregoing is intended as illustrative and not as limitative, since within the terms of the appended claims, various structural modifications may be made without departing from the invention.

What is claimed is:

1. A display actuating transmission comprising a driving shaft, a driven shaft in alignment with said driving shaft and longitudinally spaced therefrom, a frame in which each shaft is rotatably mounted, the frames overlapping and being pivoted together by a pintle located below said shafts, a friction wheel rotatably mounted in the driven shaft frame by a stub shaft, a pinion gear on said stub shaft meshing with a gear on said driven shaft, said driving shaft having a free end normally in contact with the periphery of said friction wheel, whereby rotation of said driving shaft causes rotation of said driven shaft through said friction wheel and gears, and a helical spring mounted at about the level of said shafts with its ends secured to said frames and being located above said pintle to tend to maintain constant frictional conditions during driving contact while permitting pivoting of said frames about said pintle and allowing driving contact to be made and broken.

2. A transmission comprising a driven shaft, a driving shaft longitudinally spaced from the driven shaft and located lower than said driven shaft but pivotable relatively thereto, friction means connected through gearing to said driven shaft, said driving shaft being in contact with said friction means during normal operation of said motor and out of contact with said friction means when said shafts are relatively pivoted, a frame member for each shaft, said frame members being pivotally connected, a pintle by which the frame members are pivotally articulated and a contractible-and-expansible element having its ends secured to said frame members, whereby relative pivotal movement of said frame members about said pintle allows contact to be made and broken between said driving shaft and said friction means and said contractible-and-expansible element maintains substantially constant frictional contact between said driving shaft and said friction means during driving contact.

References Cited in the file of this patent

UNITED STATES PATENTS

| 752,778 | Hundhausen | Feb. 23, 1904 |
| 758,323 | Lindquist | Apr. 26, 1904 |
| 2,254,844 | Guedon | Sept. 2, 1941 |
| 2,585,724 | Barany et al. | Feb. 12, 1952 |
| 2,898,771 | Faulkner | Aug. 11, 1959 |